United States Patent
Verkasalo

(10) Patent No.: US 10,084,869 B2
(45) Date of Patent: Sep. 25, 2018

(54) METERING USER BEHAVIOUR AND ENGAGEMENT WITH USER INTERFACE IN TERMINAL DEVICES

(71) Applicant: Verto Analytics Oy, Espoo (FI)

(72) Inventor: Hannu Verkasalo, Engelberg (CH)

(73) Assignee: VERTO ANALYTICS OY, Espoo (FI)

( * ) Notice: Subject to any disclaimer, the term of this patent is extended or adjusted under 35 U.S.C. 154(b) by 0 days.

(21) Appl. No.: 14/046,502

(22) Filed: Oct. 4, 2013

(65) Prior Publication Data
US 2015/0100887 A1  Apr. 9, 2015

(51) Int. Cl.
*H04L 29/08* (2006.01)
*G06F 3/0482* (2013.01)
*H04L 12/24* (2006.01)

(52) U.S. Cl.
CPC ............ *H04L 67/22* (2013.01); *G06F 3/0482* (2013.01); *H04L 41/0803* (2013.01); *H04L 41/22* (2013.01); *H04L 67/02* (2013.01); *H04L 67/10* (2013.01)

(58) Field of Classification Search
CPC ................................ H04L 67/22; G06F 3/0482
See application file for complete search history.

(56) References Cited

U.S. PATENT DOCUMENTS

| | | | | |
|---|---|---|---|---|
| 6,018,619 A * | 1/2000 | Allard | ................... | H04L 12/24 709/211 |
| 6,732,359 B1 * | 5/2004 | Kirkpatrick et al. | ......... | 718/102 |
| 7,278,105 B1 * | 10/2007 | Kitts | .............. | 715/736 |
| 7,533,344 B1 | 5/2009 | Motoyama et al. | | |
| 7,587,484 B1 | 9/2009 | Smith et al. | | |
| 8,850,251 B1 * | 9/2014 | Maeng | .......................... | 713/323 |
| 9,219,790 B1 * | 12/2015 | Filev | ...................... | H04L 67/22 |
| 2007/0156726 A1 * | 7/2007 | Levy | ............................ | 707/100 |
| 2008/0225013 A1 * | 9/2008 | Muylkens | ........... | G06F 3/04883 345/173 |

(Continued)

OTHER PUBLICATIONS

Title: Benefits of User ID, Publisher: Google, Publication Date: Aug. 13, 2013, URL: https://support.google.com/analytics/answer/3123663?hl=en (Year: 2013).*

(Continued)

*Primary Examiner* — Abdullah Al Kawsar
*Assistant Examiner* — David V Luu
(74) *Attorney, Agent, or Firm* — Young & Thompson

(57) ABSTRACT

Electronic terminal device including a processing entity for processing instructions and other data, functionally connected user interface entity, a display and user input elements, optionally a keypad or a touch-sensitive arrangement in connection with the display, a memory entity for storing the instructions and data, and a communication interface for transferring data with external entities, configured, in accordance with the instructions, to store data including a number of predetermined fingerprints, each characterizing display usage such as visual objects associated with software entities and potentially shown to the user via the display during execution of the software entity, and log data including behavioral data indicative of user engagement with the UI of the device, the logging incorporating detecting display usage, and storing indication of such detection in the memory, wherein the device is configured to determine the status of the display, and execute the logging according to the determination.

16 Claims, 4 Drawing Sheets

(56) References Cited

U.S. PATENT DOCUMENTS

| | | | |
|---|---|---|---|
| 2009/0177758 | A1 | 7/2009 | Banger et al. |
| 2010/0131642 | A1 | 5/2010 | Chalikouras et al. |
| 2010/0131847 | A1* | 5/2010 | Sievert et al. ............... 715/719 |
| 2010/0313009 | A1* | 12/2010 | Combet et al. ............... 713/150 |
| 2011/0264663 | A1 | 10/2011 | Verkasalo |
| 2012/0281080 | A1 | 11/2012 | Wang |
| 2013/0050118 | A1 | 2/2013 | Kjelsbak et al. |
| 2013/0124309 | A1* | 5/2013 | Traasdahl et al. ......... 705/14.49 |
| 2013/0160087 | A1* | 6/2013 | Davis et al. ...................... 726/4 |
| 2013/0185411 | A1* | 7/2013 | Martin .................. H04L 63/20 709/224 |
| 2014/0207734 | A1* | 7/2014 | Lin .................. G06F 17/30174 707/610 |

OTHER PUBLICATIONS

Ganesan Velayathan et al., "Investigating User Browsing Behavior", 2007 IEEE /WIC/ACM International Conferences on Web Intelligence and Intelligent Agent Technology Workshops, Nov. 2007, pp. 195-198, ISBN: 0-7695-3028-1, DOI: 10.1109/WI-IATW. 2007.122, XP03119984.

International Search Report dated Feb. 15, 2015, Corresponding PCT patent application No. PCT/FI2014/050749.

Supplementary European Search Report issued in Application No. 14850801.3, dated Feb. 17, 2017.

European Office Action issued in Application No. 14850801.3, dated Apr. 6, 2018.

* cited by examiner

US 10,084,869 B2

METERING USER BEHAVIOUR AND ENGAGEMENT WITH USER INTERFACE IN TERMINAL DEVICES

FIELD OF THE INVENTION

Generally the invention pertains to digital devices, communications including mobile and wired Internet-based communications, and related applications and services. In particular, however not exclusively, the present invention concerns tracking of behavioural events associated with human-operated mobile and Internet devices and media consumed thereon.

BACKGROUND

Various modern media measurement and analytics solutions such as so-called mobile and Internet panels are typically utilized by the marketing firms, audience measurement professionals and hardware, application (app) or service vendors to characterize the behavior of the users of the supplied digital products through obtaining and analyzing the related usage data. The evident goal is to get grasp on the underlying trends, habits, problems and needs, whereupon better functioning and larger audience reaching products, more accurate marketing and obviously elevated business profit could ultimately emerge.

Many of the contemporary analytics tools seem to concentrate on tracking a number of relatively general technical indicators such as predetermined HTTP (Hypertext Transfer Protocol) events and e.g. active thread/application names, or exploiting application and/or platform-specific, highly tailored meters, which either limits the versatility of the obtainable data or complicates and slows down the development of the tools and related logic considerably as they have to be particularly tuned regarding each monitored product, respectively. Thus, so far the main approach to implement mobile and Internet tracking systems has been in monitoring certain specific indications of data traffic or the internal signals or states of the target entities, such as applications, during the usage thereof on mobile and Internet platforms.

However, the evolution of media and Internet services such as web sites or web-accessible services is now faster than ever. Both wired (e.g. computers and smart TVs) and wireless devices (e.g. tablets and smartphones) have already changed the way people access and engage with digital services, and as a result, both the business and technological landscapes are encountering constant turbulence. Further, user behavior is changing quickly due to, for instance, parallel use of multiple competent devices ranging from smartphones to tablets, and from laptops to smart TVs. Particularly in mobile context, consumers already have a choice from a library of over a million applications, or 'apps', available in the app stores, and they can opt to use not only native applications but also e.g. HTML5 (Hypertext Markup Language) applications, widgets, web sites, or something in between.

It is also very likely that at least in the near future we will see no stop or even interruption in the integration type trend of these devices and services concerning e.g. mobile payments, Internet-based transactions, authentication, m-commerce, e-commerce, coupons, next generation serendipity, NFC (Near-field Communication) based services, location-based services such as advertising, transactions with the physical world and divergence in UIs (user interface) in terms of e.g. smart goggles, multiple-screen devices and speech control. More and more devices, equipped with different screens and generally UIs, will enter the market and correspondingly, even a greater number of apps and features will become available to the general public.

The data resulting from the current data collection and mining tools is simply not adequate as to the growing demand for digital analytics and audience estimations.

There's thus a need for scalable media measurement solution capable of mobile and Internet measurements and adapting better to modern media environment arising from the increased complexity and fragmentation of the related devices, applications and services, thereby providing for a dynamic, high resolution scalable approach for mobile and Internet metering and analytics.

For example, both the markets considering e.g. hedge funds, portfolio analysts, and investment banks, and mobile/Internet industry players such as device vendors, carriers, app developers, and Internet companies all alike, would prefer obtaining substantially real-time insight on the actual use of Internet services—whether used through native apps, HTML5 software, web sites, or widgets.

Holistic projections of the digital audience, over the long-tail of properties, conducted e.g. on a daily basis, would undoubtedly be rather useful in supporting fact-based decisions, whether it is about investing into a stock, analyzing competition, or understanding consumer behaviors to gain new users, minimize churn or to increase user engagement, for instance. Instead of survey data or data on installations, on-device metered reach and engagement data on total and unduplicated usage could indeed be offered e.g. through a dynamic web reporting dashboard and integrated business intelligence tools, providing near real-time statistics and various options for users to extract relevant data cuts and correlations themselves, whenever they need it.

SUMMARY

In the light of the foregoing discussion, the objective of at least alleviating the defects associated with available prior art solutions is achieved by various embodiments of an electronic device, an arrangement and a method in accordance with the present invention disclosing a preferred technology particularly suitable for mobile and Internet analytics including data logging such as behavior tracking and monitoring of the user engagement with the device UI(s) in connection with a myriad of electronic devices and related software entities including applications and services, and different features thereof.

Therefore, in an aspect of the devised solution an electronic terminal device comprising a processing entity for processing instructions and other data, a user interface (UI) entity for interfacing the device with a user and comprising a display and a user input means, optionally a keypad or a touch-sensitive arrangement in connection with the display, a memory entity for storing the instructions and other data, and a communication interface for transferring data with external entities such as a network infrastructure, is configured, in accordance with the instructions, to store data comprising a number of fingerprints, each characterizing the display usage, at least some of the fingerprints preferably characterizing one or more visual objects associated with one or more software entities and potentially shown to the user via the display, and log data comprising behavioral data indicative of user engagement with the UI of the device, incorporating detecting the display usage based on the fingerprints, preferably incorporating detecting the presence of any of said objects rendered on the display based on the fingerprints, and storing indication of such detection, such as fingerprint id and/or metadata associated with the fingerprint, in said memory, wherein the device is configured to determine the status of the display, and execute said logging according to the determination.

Preferably, executing said logging in accordance with the determination, i.e. control logging procedure(s) accordingly, may include at least one action selected from the group consisting of: inclusion of an indication of the determined display status in the logged data, adapt said logging, trigger logging, trigger logging of behavioral data, trigger logging of predetermined data, cease logging, cease logging of behavioral data, cease logging of predetermined data, change logging parameter such as interval, and trigger said detecting.

Preferably, determining the status incorporates determining whether the display is in use or not, i.e. general or overall usage status. Further preferably, substantially exclusively when, according to the determination, the display is in use, the device is configured to execute or trigger executing said detecting. In typical use scenarios, the display is used to render different application/service data and e.g. camera sensor data (image data), or 'electronic viewfinder data', thereon.

Optionally, the determination result regarding display status may trigger conducting or be at least one prerequisite for conducting further actions such as data transfer.

In one embodiment, the device is configured to observe and optionally log events indicative of, besides user behavior, or generally user activity, also device and/or network activity. Such information may be gathered from a number of various on-device technical interfaces that may directly or indirectly indicate possible user actions.

In particular, the device may be configured to observe and optionally log data regarding at least one element selected from the group consisting of: user online action, HTTP activity, sensor output, sensor, acceleration, accelerometer, illumination or light intensity, application usage, application launch, application termination, user id, process thread, identity of application or service used, feature used in application or service, device-internal data traffic, network traffic, source or destination entity of internal and/or network data traffic, voice call, application thread counter, process counter, message, e-mail message, short message, multimedia message, instant message, data counter, location, battery status, and network signal strength. These data points may turn out useful on their own or provide valuable information in combination with the display usage, or 'display activity', based measurements. Indeed, multiple different observations may be combined upon capturing and/or analysis for providing more comprehensive look into device usage.

These so-called technical measurements or observations, such as process thread observations, may be associated, supplemented, or combined with display-based observations e.g. in common log(s), to reconstruct more comprehensive and detailed records of user activities. For example, in some embodiments display-based observing may be executed to validate that the user was engaged, and/or what was e.g. the activity name, whereas more detailed technical observations are utilized to obtain further information about desired related characteristics like the duration or type of activity etc.

Thus, the display activity based observations may be optionally combined or at least associated with application usage or process thread logs, and/or generally device-based metering data may be collected with network-based or at least network traffic indicating data.

In various embodiments, through the use of available relation information and time stamps, the different data sources can be brought together and multiple data streams integrated. Such procedure(s) may take place at the device itself and/or at a functionally connected remote entity such as a remote server arrangement. Logically higher level data stream(s) comprising data points of several measurements may be constructed based on two or more original data streams. In various embodiments, application or service usage (durations, start times, end times) and/or generally user engagement periods, e.g. device-wise, may be tracked, logged and subsequently analyzed by means of the suggested solution.

In some embodiments, the device is configured to detect display usage, such as the presence of predetermined objects rendered on the display, utilizing screen capturing. The obtained screenshots may be subject to analysis potentially including predetermined pattern recognition and/or feature extraction technique(s) to detect any predetermined objects therein. Detection and e.g. screen capturing procedure applied therein may be intermittent and screenshots be taken and/or analyzed periodically even when the display is in use, depending on the embodiment. Screen capturing, or 'screen sampling', may be executed at fixed or dynamic intervals.

The predetermined objects may be detected in the light of the fingerprints utilizing e.g. shape or contour data, color data, object size data, position data, etc. extracted or derived from the display data in the procedure. In other words, generally a number of known shapes, colors, icons, logos, symbols, text, characters, numbers, overall or sub-views, etc. may be recognized to match a number of fingerprints characterizing those.

Additionally or alternatively, the fingerprint data may include or be at least associated with metadata characterizing such as identifying, classifying or categorizing the application, service, event, and/or action/activity underlying the detected fingerprint. Such information may be then logged and/or transmitted forward in addition to or instead of the (id of) the fingerprint matching the display data rendered and detected. The fingerprints may characterize display usage/display activity and related entities such as applications or services with mutually varying resolution. As a coarse example, overall display status or display usage (status), such as 'in use'/'not in use', may establish or be at least included as a major component of a certain general fingerprint. On the other hand, a finer resolution fingerprint may characterize only a certain visual object appearing in a display view of a predetermined application, for instance.

In some embodiments, responsive to detection, the corresponding indication to be stored and potentially transmitted forward may, in terms of display data, relate to the detected object(s) only, or alternatively, reflect also or, potentially in certain embodiments even solely, other data shown in the display according to predetermined logic.

In some embodiments, the indication may comprise or consist of a number of characteristic vectors identifying or otherwise describing the detected object(s), related application(s), service(s), feature, activity, event, and/or other visualized data. Yet, a constructed characteristic vector may indicate further observed dynamic events such as the technical observations or the aforesaid metadata.

In some embodiments, the indication may include or characterize substantially the whole screenshot or (sub-)window therein wherein the presence of predetermined object(s) was detected. The device may be configured to a produce a compressed set of characteristics out of a screenshot for storage and/or transfer towards a network server for further analysis, for instance.

In some embodiments, data indicative of device usage such as the aforementioned screen capture data like screenshots may be pre-analyzed, or generally more coarsely or 'lightly' analyzed, in the terminal device. Optionally, further, potentially computationally more exhaustive, investigation of at least some data (e.g. text extraction/OCR) may take place locally and/or at a remote entity such as a server arrangement. A number of criteria indicative of initial relevancy of the findings may have to be fulfilled prior to further investigation. For example, (initial) detection of object matching some existing fingerprint(s) may trigger more detailed or complex analysis either substantially immediately or later; optionally as a batch run potentially executed during off-peak hours of device usage.

Yet in some embodiments, the detection of predetermined objects may be alternatively or additionally effectuated by means of secondary or implicit indicia, optionally omitting screen capturing and related explicit image data analysis. This more specifically includes the use of display power, display orientation, or display related status (e.g. keylock or generally input lock) or display touch based events to interpret what happens on the screen, and/or to validate the user's active engagement with the screen, naturally in isolation or combination with a number of other usage measurements.

In some embodiments, the device is configured to transmit, via the communication interface, such as a wireless or wired communication interface, a number of stored indications or at least information regarding a portion of those to a remote entity such as a network service or server arrangement. Such transmission may take place periodically, e.g. based on a timer and/or in response to a triggering event such as a received message, e.g. a data request, by a server or a triggering action by the user of the device via the UI.

In a further, either supplementary or alternative, embodiment the device is configured, besides taking display usage or activity into account, to dynamically adapt or alter the operation of data logging based on at least one element selected from the group consisting of: battery status, remaining battery, remaining operating time, network status (e.g. connected/not connected and/or the nature of available or active connection(s)), and the current settings of event tracking and data logging (may be user-adjustable and/or remotely controllable).

As alluded by the determination of the usage status of the display, preferably if the user is not interacting or viewing the display, and the screen is not in use and e.g. turned off, no information about on-the-display activities are collected through the aforementioned detection activity. Meanwhile, other data may still be collected and logged relative to various ongoing events. Such data may be associated with tag indicative of the background nature of the data or at least the respective data collection instant. Inversely, data regarding periods the display is being used may be tagged with corresponding indication (at least temporally being thus user activity related). Similarly, if the network signal is not available, measurements about network quality may be omitted. Nevertheless, an indication such as a log entry based on statuses and/or relevant status changes regarding monitored elements or events (display in use/not in use, network available/no signal) may be recorded at the device.

Adapting the execution of data logging may, for instance, include execution of at least one action selected from the group consisting of: triggering collection of predetermined data, interrupting collection of predetermined data, triggering predetermined data processing or analysis procedure, interrupting predetermined data processing or analysis procedure, triggering data transfer with an external entity, and triggering more detailed or coarser detection of objects on the display.

In a further, either supplementary or alternative, embodiment, the determination of display usage or display status may incorporate inspecting at least one indication selected from the group consisting of: display power or current consumption/supply, display orientation, display brightness, display lock status, user input such as touchscreen input relative to a display or data shown thereon, display status indicating API (application programming interface), and display on/off status variable. Accordingly, changes in the above indications may be monitored.

In a further, either supplementary or alternative, embodiment tracking and logging data indicative of the user engagement with the UI such as display, taking place preferably at least partly by means of display data and/or display interaction analysis such as pattern recognition, comprises observing and preferably logging the type of view (e.g. single-window vs. multi-window), active window of potentially multiple simultaneously visible windows, identity of visible windows, identity of existing windows, identity of application or service in active window, duration and/or time of use (e.g. start and/or end) of the application or service, transaction such as payment, feature and/or view accessed in/through a displayed application or service, and user activity regarding application, service or generally display, whereupon application(s), service(s), and/or window(s) catching most user attention (level of engagement) may be determined at the device and/or remote entity such as a server arrangement, for example. Such data may be obtained by means of the display data or generally display status analysis, user input means and/or sensor(s) such as camera(s) potentially tracking the user's engagement with the device (e.g. eye tracking such as motion and/or point of gaze).

From the standpoint of various embodiments, different techniques exist for determining the active window, current window scheme (one vs. multi), active application or service potentially from multiple running or existing ones. For instance, platform-specific APIs may be accessed to retrieve such explicit or implicit information. Alternatively or additionally, display data such as screenshots may be applied to detect e.g. the largest, top-most, cursor-provided or otherwise visually distinguishable or highlighted, action-incorporating etc. window and/or application, i.e. from the user's perspective 'active' window and/or application, using among other options feasible (video) image analysis algorithms such as various pattern recognition and/or tracking algorithms. Further, it may be recognized whether a certain window and/or application/service is actively used while being visible on the display, or being just visible but not actively used.

In various embodiments, the device is configured to differentiate between native applications and other applications such as HTML5 based widgets (and log data accordingly with appropriate tags, for example). Further, e.g. web browsing activity may be differentiated from other usage.

In a further, either supplementary or alternative, embodiment the device is configured to store data comprising a number of predetermined video and/or audio fingerprints in addition to visual ones. Comparison data for such fingerprints may be obtained from the display data (video) and optionally corresponding audio track, or microphone of the device, for instance.

In a further, either supplementary or alternative, embodiment a transaction, such as a financial transaction like a payment, purchase, reimbursement, or an invoicing action, is detected preferably utilizing the display data (data rendered on the display) and e.g. the fingerprints. Related information may be logged including indications of transaction party or parties, time of transaction (timestamp), and/or the underlying application or service.

In a further, either supplementary or alternative, embodiment the device is configured to transfer, preferably via a wireless communication interface, data relative to external entities such as other terminals, auxiliary devices such as glasses, headsets, and network infrastructure(s), and remote server and/or service arrangements. The device may be configured to receive a number of fingerprints or at least data to locally construct the fingerprints from the external entity. Additionally or alternatively, data such as event data transferred between the terminal device and auxiliary device such as UI device, e.g. a smart watch, smart goggles or other wearable devices like Google Glass™, may be tracked and logged according to predetermined logic. For example, screen captures may be received from external UI device like camera-provided or generally image sensor-provided goggles. The devices exchanging data may be tethered.

In various embodiments, the users may in practice carry multiple devices, optionally several of which may be Internet-capable, with them, or at least have simultaneous access to multiple devices somehow associated with him/her, whereupon the devices are logically jointly tracked (reflective of a user's overall behavior, activity, attention and engagement with the devices) and associated data logged in accordance with the present invention and related data transfer between the devices and/or devices and external entity such as a server arrangement. Several devices may, in principle, be simultaneously 'on' or 'active' (powered and executing e.g. application(s)), but typically still in terms of user engagement major differences may rather likely exist.

For instance, smart TV or other similar device, potentially a tablet, may be utilized somewhat passively in the background by the user if e.g. video or audio stream is consumed, whereas some other applications/services such as real-time communication applications/services usually require more attention from the user. Principal device catching most user attention, or generally the level of engagement relative to several or all monitored devices, may be thus tracked substantially in real-time and/or offline (by one of the devices or a remote entity such as a server arrangement, for instance) based on gathered data, and such information be then stored e.g. in a log. User or in particular e.g. eye (e.g. motion and/or point of gaze), head, body, limb, hand, and/or finger movements, and/or the actual device movement (e.g. by accelerometer or location (sensor) data), may be tracked and utilized in determining the user's engagement/attention towards different devices. As mentioned hereinbefore, the same or similar issues may be monitored also during or relative to a single device and applications/services/windows running therein.

In a further, either supplementary or alternative, embodiment, the device is configured to monitor whether data logging feature is active, up and running and e.g. responsive to events to be tracked, and if that is not the case, further configured to (re-)activate it. Such monitoring may be responsive to a number of predetermined events and/or periodic, for instance.

In connection with some platforms, it may be advantageous that the event tracking module is configured to deliberately execute task(s) that are known to facilitate maintaining data logging feature running as otherwise the platform, e.g. operating system thereof, may shut it down due to passivity according to predetermined criterion, etc.

In other words, preferably the event tracker and in particular data logging feature thereof is designed such that it is resistant to any technical process or user behavior that could otherwise result it being turned inactive. To implement a watchdog entity for the purpose, e.g. a separate process may be initiated that checks whether the tracker and/or logging feature is up and running or not, and if not, the process will reinitialize it. Also a feature may be implemented to verify that when the device is turned off and back on, tracker/logging is started.

In another aspect already briefly discussed hereinbefore, a server arrangement including one or more functionally connected servers, comprises a processing entity for processing instructions and other data, a memory entity for storing the instructions and other data, and a communication interface for transferring data, wherein the arrangement is configured, in accordance with the instructions, to store data comprising a number of fingerprints regarding the display usage at terminal devices, at least some of which preferably regarding one or more visual objects associated with one or more software entities and potentially shown to a user via a display of a terminal device, process data received from a plurality of terminal devices and indicative of terminal device usage and of related display usage, preferably indicative of visual objects rendered on the display of the terminal device during user engagement, in view of the fingerprints, and construct a number of aggregate usage indicators or statistics reflecting user behavior and engagement with the associated terminal devices, applications, services and/or features.

In one embodiment, the arrangement may be configured to transmit, via the communication interface, the fingerprints to a terminal device to enable the device to control or adapt data logging including display view analysis threat based on the fingerprints.

In another embodiment, the received data further incorporates data captured during the periods of user passivity or non-engagement indicative of e.g. device, application, service or feature background activity. Alternatively or additionally, the received data may further incorporate such data logged during the periods of user engagement but not at least explicitly indicative of the display events.

In a further embodiment, the arrangement is configured to, during said processing, to detect the presence of any of the visual objects as indicated by the fingerprints in the received data. The received data may incorporate or at least characterize screen captures or portions thereof shown on the display of the terminal device in question. Alternatively or additionally, the received data may include coded indications of already-detected (by the terminal) visual objects and/or a number of other objects shown on the display of the terminal device.

Especially having regard to cases where the data comprises the screen captures themselves, it may be beneficial to the server arrangement to implement also image analysis with applicable pattern recognition techniques as already mentioned hereinbefore relative to the corresponding or preliminary analysis potentially taking place in the mobile and (other) Internet devices. Analysis of screenshots may be thus executed by the terminal devices, by the server arrangement, or both, depending on the particular embodiment in question. For example, the terminal devices may perform initial analysis and optionally pick up and log only selected data for the server side analysis, whereupon the server arrangement executes a more detailed and potentially computationally more exhaustive study.

In various embodiments, the server arrangement may be configured to establish, on the basis of the data acquired from a population of terminal devices/users, at least one indicator selected from the group consisting of: application, service or feature usage, user profile, application or service usage pattern, long-tail estimate of Internet, device, application, service or feature usage, duration or time of application, service or feature usage, location of application, service or feature usage, multi-screen usage, multi-device usage, use of auxiliary devices, user engagement between devices, applications, services or features, churn of users relative to application or service, reach of application, performance of application or service, service or feature, Internet usage, network usage, cellular network usage, WLAN usage, short-range communications usage, monetization of application, monetization of service, mobile payment, coupon, authorization, mobile purchase, digital transaction, signal strength, quality of speech, network speed, transfer rate, average transfer rate, minimum transfer rate, maximum transfer rate, memory usage, CPU or generally processor load, application crashes, and service down-time.

Further, the server arrangement may be configured to output or generally provide the indicator(s) for consumption via an API or a UI such as a web-based UI, native application, widget(s), or HTML5 application. A preferably dynamic reporting tool or application may be constructed. The implemented solution may support flexible filtering and aggregating of collected data into different desired representations or views potentially incorporating charts, textual data, numeric data, and/or tables. Various statistics and breakdowns may be generated based on user input defining the data elements to be inspected therewith.

The server arrangement may also include a fingerprint generation module configured to relative an application or service define a fingerprint comprising data indicative of display view associated therewith, e.g. object shown thereat. The module may apply a predetermined logic, such as web scraping logic, that automatically accesses applications/ services and constructs the related fingerprints, and/or an operator may manually control fingerprint generation by signaling to the module which applications/services and potentially visual displays/objects thereon should be transformed into fingerprints. In connection with fingerprints, the module may store (meta)data relating to the application/ service fingerprinted including e.g. identification data.

In some embodiments, the server arrangement may be configured to associate multiple devices providing data thereto with a common entity, such as a single user, preferably applying a number of available indicia including at least one element selected from the group consisting of: recurring, close proximity between the terminals, common or similar identification data relating to the terminals, recurring substantially same location among the terminals, and common or similar data provided by the terminals.

Location data and distance/proximity data utilized in determining the possible association may include e.g. cellular or generally wireless network based positioning data (e.g. cell ID data), satellite positioning data (e.g. GPS or GLONASS data) and/or computer network (address) positioning data (e.g. IP address data).

Yet, a system comprising a number of terminal devices as disclosed herein and an embodiment of the server arrangement may be provided.

In a further aspect, a method for tracking behavioral events to be performed by an electronic device, such as a wired Internet device, a mobile terminal or a tablet, provided with at least functionally connected, optionally integrated, display, the method comprising obtaining data defining a number of fingerprints regarding the display usage, a number of which preferably regarding one or more visual objects associated with one or more software entities and potentially shown to a user via the display, and logging data comprising behavioral data indicative of user engagement with the UI of the device, incorporating detecting the display usage, preferably the presence of any of said objects as rendered on the display based on the fingerprints, and storing an indication of such detection, wherein the status of the display is determined and said logging controlled in accordance with the determination.

Preferably, it is at least determined whether, based on one or more predetermined indications, the display of the device is in use or not, and substantially exclusively when, according to the determination, the display is in use, said detecting is performed.

The method may further incorporate storing indications of other events detectable at the device preferably regarding user, device, application, service or feature activity. Data logging procedure may be similar to that of the embodiments of the electronic terminal device discussed hereinearlier.

Yet, the method may include transferring the stored indications to a remote entity such as a server arrangement. The arrangement may subsequently analyze the data and construct e.g. aggregate indicators or statistics, as again mentioned hereinbefore, on the basis of such data received from a plurality of devices.

Still in a further aspect, a method for analyzing data collected by a plurality of electronic devices, comprising receiving data collected by a plurality of electronic devices and indicative of terminal device usage and of related display usage, preferably indicative of visual objects rendered on the display of terminal device during user engagement, in view of a number of fingerprints characterizing the display usage, wherein fingerprints preferably characterize a number of predetermined visual objects associated with one or more software entities and potentially shown to a user via the display of the device, and constructing a number of aggregate usage indicators or statistics reflecting user behavior and engagement with the associated devices, applications, services and/or features.

The previously presented considerations concerning the various embodiments of the terminal device may be flexibly applied to the embodiments of the arrangement, system or the two methods mutatis mutandis, and vice versa, as being appreciated by a skilled person.

The utility of the present invention arises from multiple issues depending on each particular embodiment thereof. First of all, the invention offers a solution for computationally, memory- and data transfer-wise effective metering, recognition and tracking of behavioral events with entities such as apps, web sites and widgets, which are primarily meant to be used with wireless or wired digital terminal devices provided with one or more UIs. One of the philosophical key points technically embodied herewith relates to the provided opportunity to monitor and measure events along with the user and in a way also the user truly perceives the situation, i.e. via the display-rendered events (what does the user see/which objects are rendered visible, when the engagement starts or ends, what is the engagement's duration and which are the used applications/services/features, what type of transactions are made, etc.) not forgetting the possibly of also tracking the various background events or events occurring at the periods of user inactivity.

In certain embodiments, the utilized display data analysis or 'screen capture technology' may be made particularly suitable for quickly recognizing repetitive and standardized shapes, for example in-app and in-game transactions and payments, use of widely used mobile and Internet, or generally network accessible, applications and their features (authentication, payments, actions), for instance. The technology also works with applications that lean on web-based technologies (HTML5 widgets) but do not generate traditional HTTP requests, and cannot be observed by technical observers running application process threads.

Most features of the solution have been thus cleverly designed as device and technology (native apps, HTML5, widget, etc.) agnostic, i.e. the solution is agnostic to the technical delivery of service, and yields major applications in a number of businesses around media/Internet behavior tracking. The methodology and technological backbone presented are applicable, among other uses, with panel based research methodologies, or e.g. through the use of SDKs that may be embedded in applications/services distributed to the user's online and/or mobile devices.

The solution described herein is indeed feasible in various contexts and use scenarios potentially associated with, but not limited to, media measurements, web/online analytics, recognition, scraping and interpretation of various purchases or generally (financial) transactions, gamification, tracking of web sites and native apps, tracking of multi-screen behavior, capturing the long-tail of Internet and mobile properties, and all this while providing access to the gained data and analysis results via dynamic and interactive, preferably web-based, reporting tools such as dashboard style tools.

By the provision of tools to measure the long tail of media properties, the suggested solution may cater to key verticals that require analytics on the usage and performance of applications, services like the Internet services and e.g. digital marketing initiatives, reflecting quickly shifts in the installed base of devices or applications and providing a holistic outlook on the achieved performance, i.e. what works and what doesn't/what should be improved. It further describes the competitive landscape, which are the services that might turn into success stories of tomorrow, and which services have already failed or are rapidly deteriorating in terms of reach or monetization, for example. Altogether, such measurement services are provided with today's real-time, interactive self-serve reporting needs in mind.

As one key issue, and notwithstanding the fact the presented solution may be technically realized as practically completely user-transparent, user consent is advantageously always obtained beforehand even when the tracking activities are executed anonymously, i.e. the user identities are not monitored or stored with the acquired data. For the purpose, the solution may incorporate a UI through which the user may adjust various settings potentially affecting also the user's privacy or even turn the monitoring completely off. Further, behavioral tracking may be associated with reciprocity such as incentives the user receives in response to accepting the tracking. The incentives may include free devices, applications, services, or related features, and indirectly also better functioning or otherwise updated versions of used applications/services due to the improvements made thereto based on the developer side analysis of the tracking data. Yet, the users may be provided with more accurately targeted content such as applications, services, media items (e.g. text, graphics, audio, video, ads), etc.

Further benefits relating to the embodiments of the present invention become evident to a skilled person on the basis of following detailed description.

The expression "a number of" refers herein to any positive integer starting from one (1), e.g. to one, two, or three.

The expression "a plurality of" refers herein to any positive integer starting from two (2), e.g. to two, three, or four.

The expression "data transfer" may refer to transmitting data, receiving data, or both, depending on the role(s) of a particular entity under analysis relative a data transfer action, i.e. a role of a sender, a role of a recipient, or both.

The terms "display" and "screen" are herein used interchangeably. Further, the term may refer to a data projector regarding embodiments wherein data is visualized to the user therewith.

The term "screenshot" may herein refer to data indicative of a display view extract regarding essentially the whole display view or just portion, e.g. window, therein.

The term "service" may herein refer to various terminal-accessible services such as both locally running services and online/network services, such as websites, accessible with suitable client application such as a web browser or a native application.

The terms "a" and "an" do not denote a limitation of quantity, but denote the presence of at least one of the referenced item.

The terms "first" and "second" do not denote any order, quantity, or importance, but rather are used to distinguish one element from another.

Different embodiments of the present invention are disclosed in the dependent claims.

BRIEF DESCRIPTION OF THE RELATED DRAWINGS

Next the present invention is described in more detail with reference to the appended drawings in which FIG. 1 illustrates the concept underlying various embodiments of the present invention incorporating electronic terminal devices for collecting behavioral and preferably also other activity data and a server arrangement for executing related analytics and result provision.

DETAILED DESCRIPTION OF THE EMBODIMENTS

Generally, the suggested solution enables the establishment and provision of media measurement services that allow metering of content consumption and service usage on various communications-enabled, typically Internet-capable, terminal devices, extracting data on the tracked users' behavior such as Internet behavior directly at the point of use, thereby helping the industry players to track undupli- cated reach, frequency and engagement, and monetization, of consumer-facing mobile/Internet properties.

The solution may be utilized to turn smartphones, tablets, desktop computers, digital goggles and smart TVs, or any other smart terminal or auxiliary devices, into an always on-type sensor that tracks the interactions with the device and converts the gathered data into actionable analytics and audience estimations. Indeed, in the context of the present invention, the terminal device may include or refer to a mobile and Internet terminal such as a so-called smartphone, a tablet computer, a wristop or watch computer, smart goggles, a desktop computer, a belt computer, a wearable such as garment-integrated computer, a laptop computer, or basically any stand-alone or integrated device capable of collecting and transmitting the described type of behavioral and potentially other activity data. Also several devices, such as a mobile terminal wirelessly connected one or more auxiliary devices like smart goggles, smart tv, brain implant, external (touch)display, smart headset, eye implant, and/or other wearable device, may form a joint or multi-device entity for recording, or 'logging', such data. The devices may log or forward data towards the server arrangement independently or via certain one or more devices as in the case of tethered devices.

Figure 1:
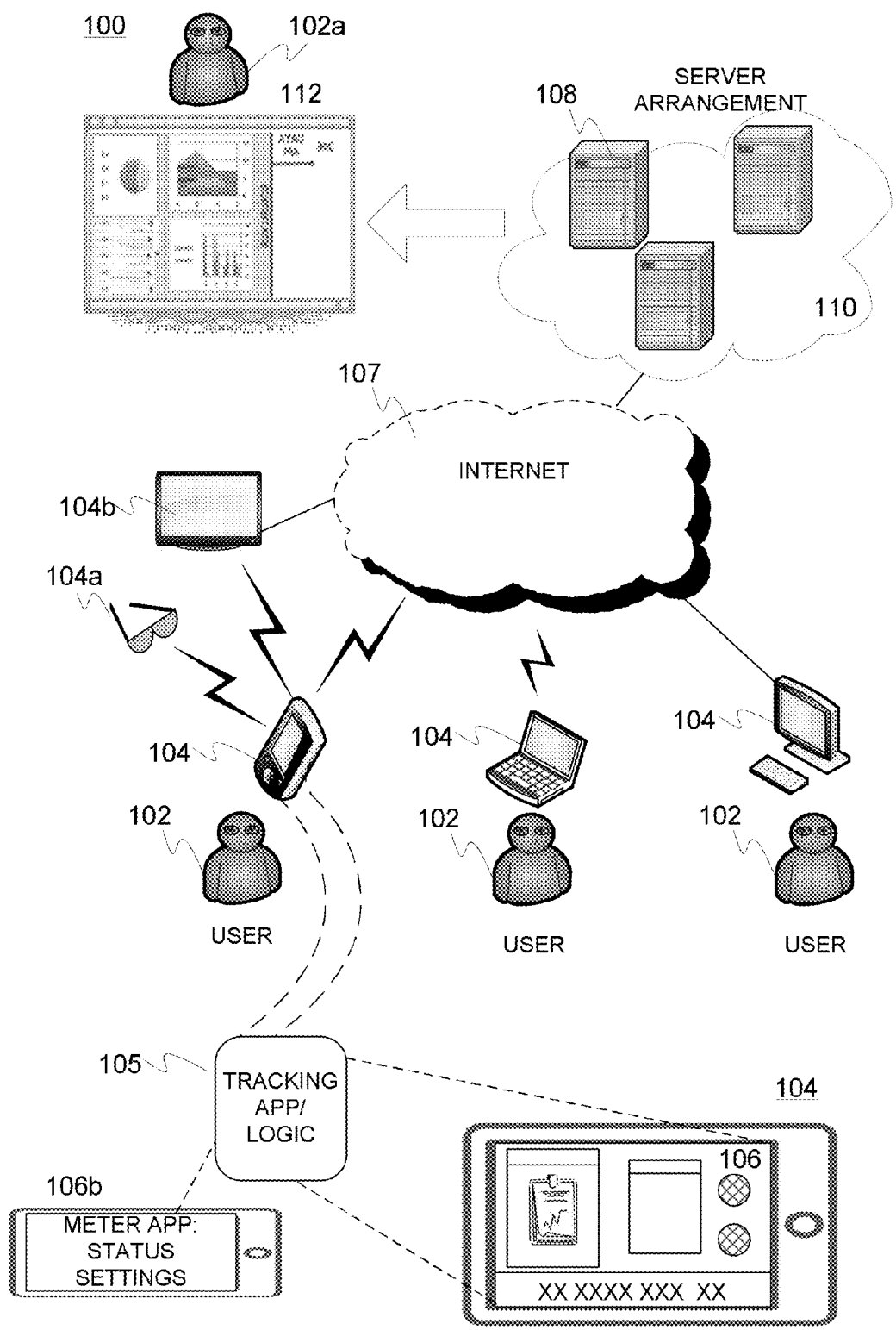

FIG. 1 illustrates, by way of example only, the concept underlying various embodiments of the present invention incorporating electronic terminal devices for collecting behavioral and preferably also other activity data, and a server arrangement for executing related analytics and analysis result provision.

The shown system 100 incorporates a plurality of terminal or related auxiliary devices 104, 104a, 104b in possession of/used by a number of users 102. A single user 102 may have or be associated with multiple devices 104, 104a, 104b that may or may not also communicate with each other. For example, terminal device 104 and external auxiliary such as external UI (device) 104a, e.g. a display, may naturally communicate with each other. The devices 104, 104a, 104b may be provided with tracking logic 105, in practice track- ing software application, that is capable of tracking user behavior through the analysis of e.g. display data. The devices 104, 104a, 104b may comprise wired and/or wire- less communication interface(s) for enabling communica- tion between the tracking logic 105 and a server, or 'service', arrangement 108 via available transfer medium/path such as the Internet or other applicable network(s) 108 such as cellular networks in the case of cellular phones. The instances of tracking logic 105 installed at several devices 104, 104a, 104b of the same user may also be configured to communicate (on the system-level) with each other. Espe- cially some auxiliary devices 104a, such as smart goggles or other supplementary UI-providing devices, may merely bear means for directly interfacing with the corresponding host device 104, in which case the host device 104 may be configured to track also the auxiliary device 104a and provide the related data forward when necessary. The activi- ties associated with the auxiliary devices 104a may poten- tially be at least limitedly tracked by the host device(s) 104 without installing specific tracking logic 105 thereat 104a. Even if several devices 104, 104b were capable of both mutual communication and communication with the net- work independently (thus there does not have to be master- slave or main device-auxiliary device type initial relation- ship between them), the tracking logics 105 installed thereat could be optionally configured so as to provide the data forward by the selected device(s) only ("rapporteur").

The applied procedure advantageously involves logic by which automatic device and (external) user interface (UI) matching can be done. The main application running at e.g. terminal 104 may be configured to use radio interfaces to scan nearby devices such as terminals, auxiliary devices, specifically external user interfaces, etc., and whether all devices have a similar metering application running or not, the process is preferably able to match devices that are e.g. repetitively at close distance to each other according to a number of predetermined, possibly adaptive, criteria. Thereby, the mutual proximity of the user's devices and optionally also relative to other devices may be preferably constantly or at least intermittently tracked and monitored.

This information can be used to understand holistically what devices the user is using, is he using those simultane- ously or alternately, what interactions or correlations there potentially are between the operations or actions taken by the user with two or more devices.

More specifically, the information from the wireless inter- face(s) regarding the use of additional devices, such as the aforementioned auxiliary devices 104a, 104b, and attached user interfaces may be used e.g. at a terminal 104 or server arrangement 108 to build a log (file) separating the user's activities between the devices 104, 104a, 104b but still generally (at least associatively) combining such events regarding the particular user together, which may facilitate the subsequent local or remote data analysis.

In particular, the radio interfaces and related awareness of nearby, or attached devices, may be harnessed for the purposes of facilitating and streamlining data collection.

In case there are attached devices 104a, 104b or especially attached user interfaces, which have been optionally pro- vided with an IP address or equivalent by another device (this device being the master), such as the terminal device 104, the attached device or specifically attached user inter- face (this being the slave) 104a, 104b may be conveniently tracked by using the master device 104 and associated data collection logic.

For instance, a local proxy running in the terminal 104 may be configured to track the traffic to/from the another, at least in this regard "slave", device 104a, 104b, and/or e.g. screen capturing may be exploited such that the master device 104 initiates it and instructs the slave 104a, 104b accordingly, whereupon the slave device 104a, 104b is delivering capture data back to the master 104 to enable tracking what activities take place at the slave device 104a, 104b, thereby the slave device 104a, 104b not being required to run more sophisticated data collection engine(s).

In some embodiments, the terminal 104, or 'master device', may be therefore configured to log data traffic associated with one or more functionally attached devices 104a, 104b through the utilization of e.g. available API(s) providing desired information. The API(s) may reside at the terminal 104 and/or the attached devices 104a, 104b (remote API(s)). Accordingly, the terminal 104 may determine vari- ous predetermined usage information, calculate statistics, profile user, analyze user behavior preferably including user engagement, aggregate data, etc. relative to the devices 104a, 104b, as explained herein. This approach could also be optionally implemented as a stand-alone monitoring solu- tion running in any applicable terminal or generally elec- tronic device with sufficient processing, storage and com- munication capabilities, separate from the realization of other features such as screen sampling, fingerprint matching, display status monitoring or data transfer with a remote server.

Reverting to the introduction of entities shown in FIG. 1, the service arrangement 108 preferably comprises a number of at least functionally connected servers. In some embodiments, the arrangement 108 may be implemented in a cloud 110 of computing resources for enabling flexible dynamic allocation thereof.

The service arrangement 108 may be responsible for receiving tracking data such as logs from a plurality of devices 104, 104a, 104b, analyzing the data and providing the processed data in preferably in a variety of ways/forms 112 to the entities 102a interested therein such as application developers, device vendors, carriers, Internet companies, marketing firms, hedge funds, portfolio analysts, investment banks, etc. For example, different APIs, reporting tools or dashboards may be provided to output the gathered data in quickly adoptable, potentially dynamically adjustable format.

In practice, a population of users 102 may first download a specifically composed data collection application 105 to one or many of their terminal devices 104, typically Internet-capable devices, such as smartphones, tablets, desktop computers, laptops, related auxiliary devices such as smart goggles 104a, or potentially even smart consumer electronics like smart TVs 104b. It shall be noted though, as being understood by a person skilled in the art based on the preceding discussion, that in some embodiments, auxiliary-like devices like smart goggles 104a or smart TVs 104b may be also considered as stand-alone terminals from the standpoint of the present invention, if provided with internals capable of and configured to log and communicate the behavioral data in uplink direction without the help of a master-type intermediate terminal apparatus 104 whereto the device 104a, 104b is functionally connected to.

The application logic 105 of the on-device downloadable software advantageously comprises at least two main elements. First, there could be a UI 106b configured to show e.g. the status of the tracking procedure to the user and preferably provide him/her with a number of options affecting the operation of the logic. For instance, on/off switch or icon for triggering the synchronization of the collected data to the server 108 may be provided. Second, there should be the main application or corresponding logic, which is responsible for collecting data 106 including screen capturing/display data analysis in one or several threads, conducting at least optimized pre-processing of data, and finally communicating with network-based server(s) 108 in order to transfer the (processed) data there. In addition, the main application is preferably able to receive configuration messages from the network, and to assist registering the user when the app is installed for the first time.

The application logic 105 executes its tracking functionalities transparently in the background without disturbing or distracting the user 102 when possible. To achieve such objective, e.g. predetermined battery and CPU-optimization procedures may be applied to avoid unnecessary changes for the user experience. During the periods of high computational load or low battery level, the tracking procedures may be scaled down, and vice versa, among other options.

In some embodiments, the application logic 105 may be able to optimize battery drain through the dynamic and configurable use of device APIs. For example, when less granular data is needed, the logic 105 is able to track app usage characteristics and names, or web site URLs and names, through locally cached data fields, which provide at least a reflection of the previous activities without providing real-time view on those. Similarly, in some embodiments available network based entities like servers, e.g. one(s) associated with established virtual private networks, may be dynamically exploited to collect some of the required data for remote analysis at server(s) 108 without the need to then collect this data locally from the device 104, 104a, 104b.

The tracking logic 105 is advantageously run in a central processing unit of the device 104, being thus close to the "heart", or point of convergence, thereof and enabling tracking the associated user interfaces. The devices 104, 104b may indeed contain multiple integrated or functionally connected, external UIs (touchscreen, buttons, switches, voice input, headsets, digital (smart) goggles, smart watch etc.), or only a single one.

Figure 2A:
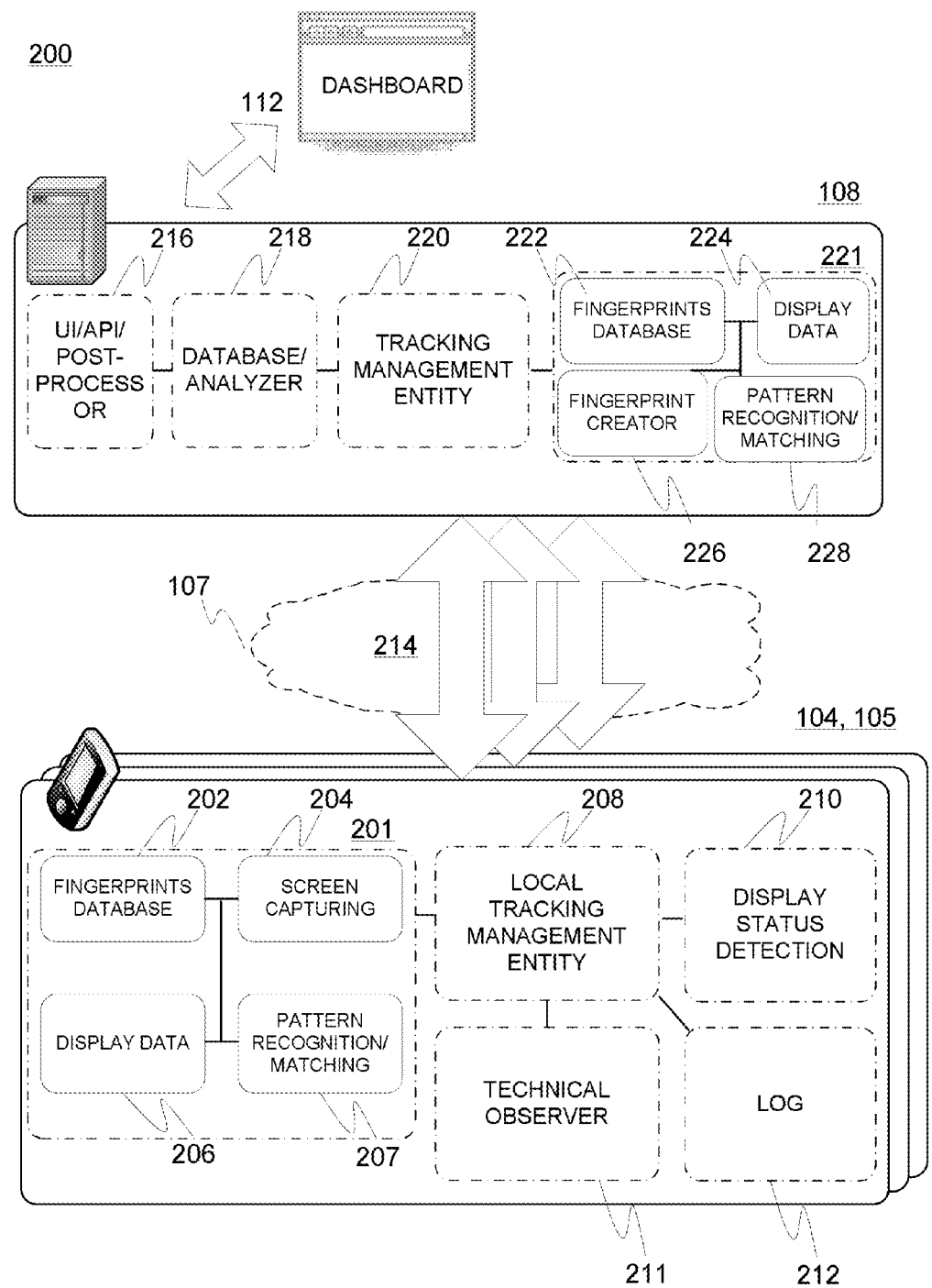
FIG. 2a shows block diagrams depicting embodiments of the terminal device and server arrangement from a logical standpoint.

FIG. 2a shows, at 200, block diagrams depicting potential embodiments of the terminal device and server arrangement mostly from a logical standpoint, i.e. in the light of functionalities provided thereto for carrying out desired embodiment(s) of the present invention.

The tracking logic 105 installed at the user terminal devices 104 (see the bottom half of the figure) is primarily running in the background as being clear on the basis of the foregoing and configured to execute various tasks assigned thereto. The tasks may include periodically capturing screen images and optionally, with the included on-device display data analysis logic, also identifying matches with digital fingerprints (e.g. indicative of certain pattern(s) formed by pixels) therein and generating indications of such detections, optionally including or associating therewith a number of compressed characteristic vectors (one could say the "DNA of the property/app") describing the identity of the content preferably as thoroughly as being possible in the light of predetermined conditions. The conditions may be based on the consumable memory space and processing load, for example. Potentially the use of other sources such as log files, optionally HTTP traces and/or app activity logs, is further implemented to support decision-making. In addition to visual display data, audio input or audio channels could be monitored and audio samples recorded for similar audio matching purposes.

As being also mentioned hereinbefore, the logic 105 is preferably further configured to collect other relevant data points, such as "technical data", and refer these data points into a particular user behavior. A heartbeat signal indicative of when the device is on, may be generated as well as various signals reflecting user engagement (screen is on, user input is obtained, sensor data such as positioning/GPS data or accelerometer data implies movement) and/or other exposure (e.g. something is visible in digital goggles, or something is audible in the headset and user has the headset on). The logic 105 is preferably able to generate a log file indicating which devices, applications, services, and/or features were used, in which context, in which mode and/or through which user interfaces.

The application logic 105 may comprise or be implemented, optionally substantially completely, as a native application capable of accessing the underlying operating system information and using a spectrum of application programming interfaces. The main application preferably includes a feature which is configured to track communications with, and access information, from connected or tethered (auxiliary) devices, and is able to thereby conduct user behavior or other metering also on devices and user interfaces attached to the main terminal.

The installation of the application logic 105 to the device 104 is preferably designed to be as simple as possible. The user may need to first agree on the potential agreements, including, for example, privacy policy, which may be done online. This process may or may not also include the deployment of simple surveys to ask for background information including demographic variables and/or data on the (terminal) device in possession of the user, for example. After this, the user (devices) may be provided with web link, e-mail-embedded link and/or e.g. a text message containing a link to trigger installing the application 105 into his/her device(s).

The package that installs the application logic 105 may be provided in several formats. In some embodiments, it may be a generic one meaning that the downloaded package does not include any information about the user downloading it. In that case, for the purposes of identifying the user he/she needs to provide predetermined identity information during the installation process, e.g. email address and/or phone number, which can be matched with information that was potentially supplied by the user during earlier registration or "sign-up" process. Alternatively, in some other embodiments the host device whereto the application 105 is installed may facilitate the identification process. For instance, the application may request it to send a message such as e-mail or text message (preferably through programmable logic without need for any user intervention) to a network server, which may then recognize e.g. the phone number of the device together with the information supplied by the main application (the installation entity ID), thereby identifying the user. The implementation process may further involve a logic thanks to which each installation package can be quickly customized. When the user has registered (using a web site for example), a dedicated customized application may be prepared for each user and/or user device, already embedding information about the user in the installation package, which may be later utilized by the application 105 to identify the user and synchronize registration information with the network-based servers.

In various embodiments of the present invention, a plurality of different IDs, typically identification numbers or e.g. codes comprising also/solely characters, may be applied in connection with the application logic 105 (instances). First, each instance, or "installation", of the application 105 to a device 104 may involve a different ID, identifying that particular device installation. This ID may be generated when the application is first started in the device and synchronized with the network server 108. For each device identity (defined by the IMEI or IMSI code, or any other device-specific code, for instance), a device ID may be generated. Further, there may be identities defined for each recognized user interface. The application 105 is preferably able to scan and observe the different types of UI attached to the main terminal, and whether they are used or not.

Yet, for each UI, a separate identification number may be allocated. Also, naturally, each user may have his/her own user identification number or other ID. One user may have multiple devices in use, each device may have multiple user interfaces, and each device has may experience one or multiple installations of the application 105. The registration and identification process keeps track of all these registrations and changes in the status of installations, devices, user interfaces, and users. Ultimately, the tracked applications, services, features, fingerprints, may naturally have their own ID information. The identification data may be selectively transmitted in connection with subsequent transfer of logged data towards the server arrangement 108. Different IDs such as the ones mentioned above may also be selectively combined to establish a number of aggregate IDs. Aggregate ID may simultaneously identify a plurality of entities associated with the application, activity, data or other factors linked with the ID.

In case the user deletes or "uninstalls" the application 105 from one of his/her devices, he/she may naturally either never install it again or re-install it afterwards. If the application 105 is re-installed one day to the same device 104, the application is preferably allocated the same ID that was previously in use. In this case, the fresh copy of the application 105 yet to be installed may have initially adopted a new installation identification number, but the server side 108 may then instruct the application 105 to re-use the original ID associated with the previous installation of the application 105. If the registered device truly is new (not been registered beforehand), then naturally also a new device identification number will be generated.

To proceed further with the actual details of the shown example of application logic 105 internals, the application logic 105 may be considered to at least logically contain a plurality of entities responsible for executing the various tasks obviously assigned thereto. The tracking management entity, or "manager", 208 may be assigned with duties regarding overall synchronization of tasks between remaining modules, data transfer between them, and communication 214 with external entities such as other terminal or auxiliary devices and e.g. network infrastructure(s) and server(s) therein. The communications may occur in a timed fashion and/or triggered by other type of triggers (e.g. predetermined events, message receipt, etc.). Further, management entity 208 may host and adopt the current settings/configuration of the tracking procedure in general. Yet, the management entity 208 may provide or interface with the UI of the application logic 104 to properly indicate the current status of the tracking system to the user and potentially receive control input as well. A specific protocol to control how the application logic 105 executes its various tasks, such as the aforementioned ones, may be implemented by the terminal device 104 and server 108 entities. Maintaining the registration data typically established upon the first install, may be maintained by the protocol. It may be also used to initiate either from the client (terminal) 104 or server 108 side a number of activities including synchronization of new configurations, sending survey data to the terminals, requesting immediate shut-down or automatic removal of the application etc. The protocol may include features for controlling the encryption and compression of data, and/or the control of data syncing with network servers, the address and identity of which may change.

Yet, the application logic 105 may implement a watchdog feature to ascertain the tracking procedures remain generally active also the silent periods of user inactivity. The logic 105 may be configured to reserve specific resources from the operating system in order to run in the background as part of other system processes and execute required operations. On some platforms, the application 105 may need to intentionally execute certain kinds of, in principle unnecessary, operations, sometimes related, sometimes unrelated to the data collection activities, to make itself active from the standpoint of the operating system and remain capable of running in the background. For instance, music (empty sound track, for instance) may be playback, data such as location data collected, or a voice-over-IP-connection maintained, to make sure the application 105 is not shut down by the system.

Technical observer 211 may contain logic for conducting a number of predetermined observations regarding aforementioned technical measurements and also those often simultaneously user behavior-indicating events that do not arise from the display data analysis. Such observations and related potential log entries may concern e.g. user online action, HTTP activity, sensor output, application usage, application launch, application termination, user id, process thread, identity of application or service used, feature used in application or service, internal data traffic, network traffic, source or destination entity of internal and/or network data traffic, voice call, application thread counter, thread activity, process counter, message, e-mail message, short message, multimedia message, instant message, data counter, location, battery status, and/or network signal strength. The technical observer 211 may be configured to execute the tasks in accordance with configuration provided by the management 208 and provide the tracking results thereto or directly to a log entity 212.

The log entity 212 may comprise optional data logging logic (unless provided completely by management entity 208) and, at least, a data repository such as one or more databases, data tables, log files, etc. for storing event data indicative of e.g. on-display detected objects (fingerprints), related technical/background events, etc. A plurality of data elements associated with each other temporally (e.g. regarding substantially simultaneously occurring/detected events) and/or otherwise contextually (regarding same application, service, feature, for example) from a number of different sources (e.g. technical observer 211, display data tracker 201, etc.) to be stored may be joined for the storage. For example, an aggregate data entity such as one realization of the aforementioned characteristic vector may be utilized to effectively store event data potentially from multiple sources such as observers together. Local joining/aggregation logic may be included in the log entity 212 and/or in the management entity 208, for instance.

Display data tracker entity 201 may be considered to incorporate the logic for analyzing the display views. Yet, it may comprise a fingerprint repository 202 comprising a library of fingerprints for enabling the detection of matching objects in the views.

Each application, service, feature, etc. may be generally associated with a number of fingerprints. Obviously, a display view may show none, one or a plurality of objects matching the fingerprints simultaneously, these then concerning one or more applications, services or related features. In many graphical UIs, several applications/services/features may be simultaneously active and also visible through dedicated icons, windows, etc.

The tracker 201 may further include a display data repository 206 for storing e.g. screenshots obtained by means of screen capturing (sub-)module 204 to be subsequently analyzed in terms of object detection. Alternatively, some (e.g. processed) or all display data may be stored in the log entity 212. Analysis sub-module 207 may take care of the actual object detection and other related image data processing tasks. The analysis may incorporate video sequence analysis e.g. in a sense that multiple screenshots representing different time instants may be at least partly jointly analyzed.

In various embodiments, a fingerprint may thus define or characterize a video object (i.e. characteristics indicated by the fingerprint are temporally spread) in addition to image, graphical and/or other visual objects. Generally, a fingerprint may characterize an object in 2-d or 3-d, for example. A visual object may be associated with one or more fingerprints. On the other hand, a fingerprint may characterize one or several objects to be tracked in display data.

The management entity 208 may instruct the display data tracker 201 to initiate/interrupt display data collecting and related tasks in accordance with the information provided by display status detection probe 210. As described hereinearlier, e.g. display power may be monitored by the probe 210 for determining the prevailing display mode that preferably indicates at least on/off status and optionally more detailed info (e.g. on, off, dimmed, extra bright, etc.).

And as mentioned hereinbefore, also audio fingerprints are applicable in connection with the present invention.

Generally, display related analysis procedures may be divided into three areas, for instance. These procedures may be utilized in parallel or selectively depending on the embodiment. First, the display status and particularly usage status can be observed via display power status, for example. If the display is off, i.e. inactive/not in use, the main application 105 can provide a log entry indicating that the user is passive/not present, or not at least doing anything (requiring the display). The device 104 may execute a number of applications in the background at any given time, but still the user is not considered to use or engage with them. The screen power observer may validate this background activity and enable filtering out or tag activities that are not associated with or indications of real user engagement.

Second, the application 105 may use its access to technical data or "measurements" such as application programming interfaces (APIs) that provide possibly direct information about the active application or other entity visible in the display, even continuously. This information combined with the display status/power observer, is able to rather precise information on the type and identities of the activities people practice in the display.

Third, screen capturing, or "sampling", may be executed at defined frequencies.

As at least occasionally particularly sensitive or personal events such as (mobile and Internet/online) payments may be visualized through the display, the tracker 201 may be configured to capture and optionally analyze display data only when additional condition(s) for that are also fulfilled. For instance, the image capturing and further reconstruction/recognition may be executed only if certain hard-coded/predetermined or dynamically defined events take place (for example, payments are only tracked and recognized for certain application(s) or service(s), not automatically all).

As a skilled person will immediately realize on the basis of the above discussion, the used allocation of various tracking related tasks and responsibilities between different entities is only exemplary and used mainly for illustrative purposes. For instance, a common event tracking logic module could be considered to encompass all or most observation tasks with different (sub-)modules then taking care of display data related and other tasks.

The explained local logic 105 for data collection can be potentially extended with network based data collection. However, even in the network-based data collection setups, the local application 105 in the device is still preferably involved. For example, virtual private networks could be utilized in collecting data on online behavior. The application 105 could be configured to automatically or semi-automatically (direct the associated user to) install a specific configuration file to the device, which would then affect how the device communicates with the Internet. For example, a virtual private network may be turned on this way, which implies that separate network server(s) 108 are able to see traffic taking place between the device and Internet, and are able to log that information. The application 105 may be involved in this process by attaching specific identifiers to the traffic flowing through the network servers, or by requesting specific kind of configuration file(s) so that the network server(s) 108 can consequently perceive the same device ID as the application 105 running in the device, thereby facilitating the synchronization of data on the server side.

Also the display data analysis technology may be applied in both local (terminal) mode with e.g. a downloaded library of fingerprints, or in the network mode (matching is done at the network server 108 based on screen capture data such as screenshots taken by the terminal 104). The application 105 may be configured to execute the lighter weight processes, and either through batched work in the terminal itself 104, or through on-demand or batched work in the network server 108, the matching and potentially other more sophisticated scraping technologies may be both temporally and physically separated from the first level data collection and image capturing.

In the top half of the figure, server side entities have been depicted. The server arrangement 108 may comprise one or more server devices preferably functionally connected together. For example, the associated resources may be at least partially allocated from a cloud computing environment.

Tracking arrangement entity 220 may, as with the case of terminal counterpart 208, take care of overall management, synchronization, triggering, data transfer, resource allocation, etc. tasks associated with the tracking arrangement. It may be connected to a data repository 218 comprising the data received from a number of terminal devices 104. The repository 218 may further include processed, analyzed data and include or provide at least access to analysis/processing logic to conduct various data processing tasks. Various statistics indicative of device, application, service, feature usage, user behavior, related technicalities, etc. may be calculated utilizing the data either on demand or beforehand.

As already discussed above, the present invention deals with the integration of different types of data streams either locally in the data collection device(s) 104 (through the addition of relations), and/or alternatively in the server arrangement 108. For example, screen capture based observations may be combined with application usage or process thread logs, or device-based metering data may be collected with network-based data, and through the use of relations and time stamps, the different data sources can be brought together and data streams integrated. Through the use of analytics and categorization processes, second-level data streams may be regenerated based on two or more original data streams.

The data distribution module 216 may provide a variety of means for obtaining access to the collected and processed data. As listed hereinbefore, API(s), dashboard(s), reporting tool(s) may be provided either as stand-alone solutions such as native applications or via integration with other entities, such as web sites, widgets, e-mails, etc. Such distribution module 216 and related entities may be capable of executing data post-processing tasks (filtering, sorting, calculation of statistics, (K)PIs, etc.) optionally in substantially real-time during data consumption by the users and optionally receipt of user input requesting such processing (certain view on/representation of the data, for example).

Display data tracker entity 221 may comprise logic and features generally similar to the ones of the terminal's management entity 201, however being capable of processing and analyzing display data from multiple, potentially mutually rather different, devices and usage environments not forgetting the varying needs of the tracking data end-consumers such as media companies, financial institutions or device/application developers. This may require adopting specific logic and/or e.g. fingerprints for each device, device type, user, and/or user group, for example. Based on the available ID information received along the other logged data from the terminals 104, such adoption may take place even substantially in a real-time fashion.

Instead of screen capturing 204, which preferably takes place in the terminals 104, the server side display data tracker 221 may contain or be at least connected with a fingerprint creator entity 226 that generates fingerprints through a method preferably involving the observation of changes in the screen shots regarding a process of using a certain service or application. When a significant change according to predetermined criterion or criteria has taken place, it will be investigated what has changed and what has remained static or unchanged. The objects, colors, shapes, that do not change, are the ones that may be stored as the fingerprints of the service. These may sometimes include text strings, pictures, simplified shapes like logos, a set of colors, a combination of elements of different types, etc. Machine learning and especially e.g. pattern recognition approaches may be used to generate the fingerprints in an efficient manner, learning from a large amount of data supplied by simulated test runs or manual test cases, for example.

Indeed, the fingerprints may also be called as the DNA of the service/app. Regarding an embodiment of the manual approach, an operator may activate a certain application/service and subject it to the executed image recognition and fingerprinting processes, whereupon the output together with possible information/metadata about the used application and/or other relevant information, is written into the fingerprint library 222. Alternatively, in accordance with an embodiment of automated approach, a 'robot' logic may be configured to download apps and content from different sources, at the same time logging their identities and potentially other information like content category, executing them and then constructing the image fingerprints of the concerned application or service, and writing the metadata and fingerprints into the database 222. One application or service typically will have a number of characteristics (repetitive patterns) that are particularly suitable sources for defining the fingerprints that can be subsequently used for matching purposes.

Display data entity 224 may store display data such as screenshots received from terminals 104. Display data may be utilized by the analysis module 228, capable of e.g. pattern recognition, for object detection based on the fingerprints 222.

In a number of embodiments, the actual detection of fingerprints from the display data shown in the terminals may comprise methodology at least somewhat similar with the procedure of generating the fingerprints. In other words, the display view (data) under scrutiny may be analyzed similarly and temporary fingerprints be created for comparison with different fingerprints present in the library according to predetermined logic to find a match.

In some embodiments, in case no match can be found, the temporary fingerprint data may trigger an insert procedure wherein a new entry may be added in the fingerprint library. The procedure may incorporate notifying the server arrangement 108 (when not executed by the server 108 but the terminal 104 instead) about potential new fingerprint/unidentified application/service/event/activity, whereupon the server 108 may take necessary actions to analyze the situation further according to predetermined logic and optionally operator input, and potentially establish a number of new fingerprints.

Figure 2B:
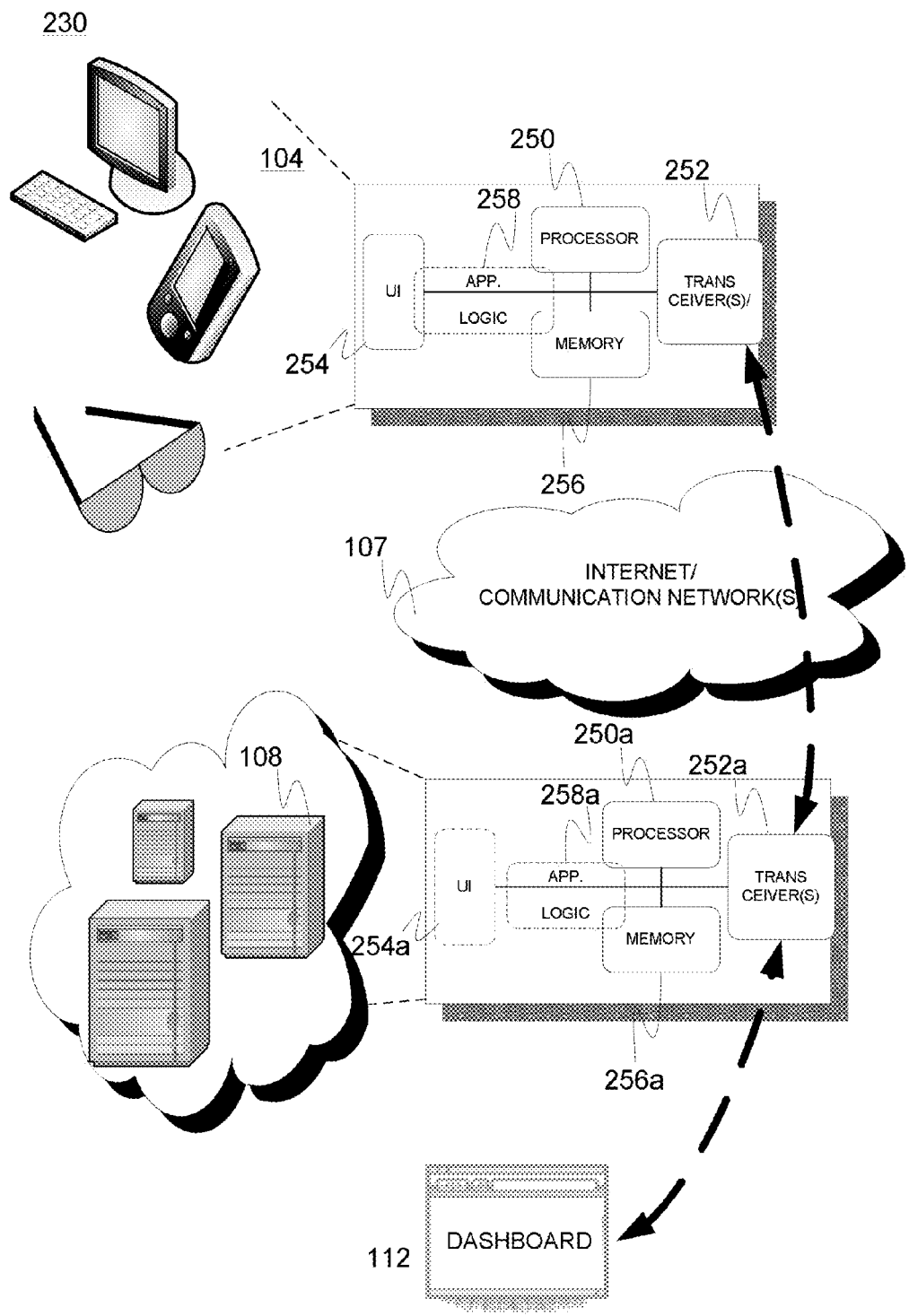
FIG. 2b shows block diagrams depicting embodiments of the terminal device and server arrangement more from equipment/hardware standpoint.

FIG. 2b shows, at 230, block diagrams depicting the selected internals of certain applicable embodiments of the terminal device 104 and server arrangement 108 essentially from the equipment/hardware standpoint. The element(s) constituting the arrangement 108, such as a number of servers, may physically each contain at least some of the shown elements.

Both the terminal device 104 and server arrangement 108 may be typically provided with one or more processing devices capable of processing instructions and other data, such as one or more microprocessors, micro-controllers, DSP's (digital signal processor), programmable logic chips, etc. The processing entities 250, 250a may thus, as a functional entity, physically comprise a plurality of mutually co-operating processors and/or a number of sub-processors connected to a central processing unit, for instance. The processing entities 250, 250a may be configured to execute the application codes 258, 258a stored in the memories 256, 256a. The memory entities 256, 256a may be physically realized utilizing one or more physical memory chips or other memory elements. The memory 256, 256a may further refer to and include other storage media such as a preferably detachable memory card, a floppy disc, a CD-ROM, or a fixed storage medium such as a hard drive. The memory 256, 256a may be non-volatile, e.g. ROM (Read Only Memory), and/or volatile, e.g. RAM (Random Access Memory), by nature.

Software (product) for carrying or at least facilitating the install procedure of the application logic 258, 258a may be provided on a non-volatile carrier medium such as a memory card, a memory stick, an optical disc (e.g. CD-ROM or DVD), or some other memory carrier, or transmitted over a network or other wired or wireless communication channel.

The UI (user interface) 254, 254a may comprise a display or a data projector, and keyboard/keypad or other applicable user (control) input entity such as a touchscreen and/or a voice control input, or a number of separate keys, buttons, knobs, switches, a touchpad, a joystick, and/or a mouse, configured to provide the users with practicable data visualization and device control means. The UI 254, 254a may include one or more loudspeakers and associated circuitry such as D/A (digital-to-analogue) converter(s) for sound output, and optionally a microphone with A/D converter for sound such as voice input.

Communication interfaces 252, 252a such as a number of wired and/or wireless transmitters, receivers, and/or transceivers for communication with other devices such as terminals and/or network infrastructure(s) are provided. For example, an integrated or a removable network adapter may be provided. Non-limiting examples of the generally applicable technologies include WiFi/WLAN (Wireless LAN, wireless local area network), LAN, Ethernet, USB (Universal Serial Bus), GSM (Global System for Mobile Communications), GPRS (General Packet Radio Service), EDGE (Enhanced Data rates for Global Evolution), UMTS (Universal Mobile Telecommunications System), WCDMA (wideband code division multiple access), CDMA2000, LTE (Long Term Evolution), and Bluetooth.

It is clear to a skilled person that the entities 104, 108 may comprise numerous additional functional and/or structural elements for providing advantageous communication, processing or other features, whereupon this disclosure is not to be construed as limiting the presence of the additional elements in any manner. For example, the terminal device 104 may include a battery and a connector for external power supply. The server 108 may include a connector for the mains.

As a remark concerning the preservation of platform resources such as available power or memory, the entity 104, 108 may be configured to observe the status of the device and monitoring or analysis application, and change the configuration of e.g. observation or analysis logic, if the battery or memory runs low, for example. Data compression may be applied to reduce the amount of data sent over communication interface/network to spare the associated resources.

Figure 3:
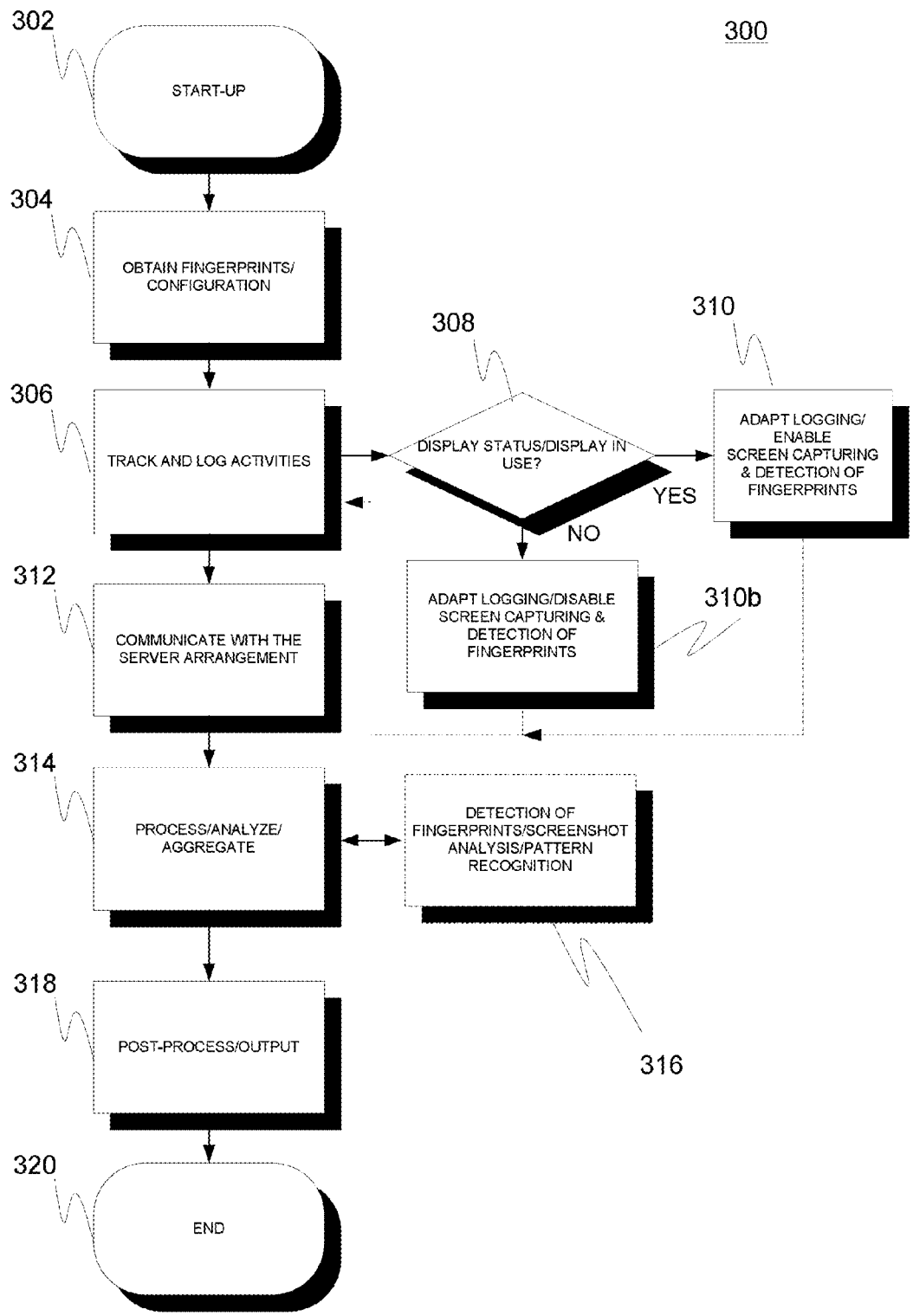
FIG. 3 is a flow chart disclosing two embodiments of a method in accordance with the present invention for obtaining and processing activity data.

FIG. 3 visualizes, at 300, a flow chart disclosing different embodiments of a method, both terminal and server side embodiments, or a joint method depending on the viewpoint, in accordance with the present invention for obtaining and processing activity related data originating from a number of, preferably plurality of (even thousands, tens of thousands or more devices may participate in the panels) data collecting terminal devices and potentially auxiliary devices or other devices coupled thereto.

At 302 the terminal and server devices of the present invention are obtained and installed, for example through loading and execution of related software, registration, ID allocation measures, etc. as mentioned hereinbefore.

At 304, fingerprints for enabling the display data analysis are obtained. Especially from the standpoint of terminal devices, it may include receiving the fingerprint definitions over the communication interface (wireless, e.g. cellular or WLAN, or wired, e.g. Ethernet) and storing them in the memory for future use in connection with event tracking, in particular object detection based on display data. Additionally or alternatively, fingerprints may be stored in the server arrangement for local use and/or distribution to the terminals.

Additionally, the fingerprint library may be constructed or updated by adding, deleting, and/or modifying fingerprints. Such procedures are typically executed by the server arrangement, but alternatively or additionally, they may be executed in the terminal as described in this text earlier.

At 306, events are tracked and logged including behavioral events indicative of user engagement with the terminal devices, applications, services, features, etc. At 308 (the check takes advantageously place at the terminals), display status is determined preferably including determining whether the display is in use or "active". Determination may take place continuously, periodically or triggered by specific trigger(s), for instance, during or prior to event tracking.

In case especially the display usage status is inferred from the available data and considered that the display is in use (positive determination), a number of related screen capturing and display data collecting, optionally also fingerprint matching, procedures 310 are triggered. Such matching may incorporate a number of image processing procedures, such as predetermined pattern recognition and/or filtering procedures, to detect the presence of visual objects characterized by one or more fingerprints in the display data. Otherwise (negative determination, i.e. display not in use), such activities are interrupted or maintained inactive depending on their prevailing status 310b.

Screen capturing/display data acquisition takes place at the terminals whereas further analysis including fingerprint based object detection may be executed by either terminals or server arrangement (316), or by both collaboratively.

Generally, at display status verification stage 308, the display status, such as the aforementioned usage status, is thereby inspected and classified, for instance, according to predetermined logic whereupon different actions may be executed as a response. Logging is thus executed or adapted at 310, 310b responsive to the display status, which may imply triggering new actions or adapting or ceasing (stopping) the execution of existing ones as already contemplated hereinelsewhere.

At 312, data transfer between the terminal and server arrangement takes place. Depending on the embodiment, transferred data may include logged data such as characteristic vectors based on detected visual objects and other observed event data, and/or screenshot data to enable the server to conduct comprehensive fingerprint matching and other image and/or video analysis.

At 314, the received data is processed, analyzed, and aggregated at the server arrangement for consumption by a number of parties.

At 316, the display data analysis based on e.g. terminal-captured screenshots may take place in embodiments wherein the analysis at the terminal is omitted or performed only partially (e.g. coarsely). Also here, the analysis may incorporate a number of predetermined image processing procedures such as pattern recognition, matching, tracking and/or filtering procedures.

At 318, the consumers or system end-users are provided with the desired kind of instances (tables, databases, graphical notations, listings, charts, applications, messages, API(s), etc.) describing the aggregated and analyzed data indicative of user behavior and originally harvested from a number of terminals or corresponding data collection devices.

At 320, the method execution is ended. As being clear to a skilled person, the execution of the shown method items may be, and typically is, repetitive and their temporal relationship is not strictly sequential, i.e. they may overlap. For example, event tracking may be continued at the terminal while the previous results (logs) are transferred, processed, aggregated, distributed, etc. by the terminal and/or the server arrangement. Both real-time/continuous and batch-type approaches are applicable for most of the suggested operations.

Several terminals may, of course, execute the mutually identical or tailored instances of the method items simultaneously and send related data to the same server arrangement for analysis, storage and distribution.

A computer program, comprising a code means adapted, when run on a computer, to execute an embodiment of the desired method steps in accordance with the present invention, may be provided. A carrier medium such as an optical disc, floppy disc, or a memory card, comprising the computer program may further be provided.

Consequently, a skilled person may on the basis of this disclosure and general knowledge apply the provided teachings in order to implement the scope of the present invention as defined by the appended claims in each particular use case with necessary modifications, deletions, and additions. In accordance with the spirit of this document, features of different embodiments described herein may be basically autonomously and flexibly combined by a skilled person unless stated, or being implicitly clear (evident incompatibility), otherwise.

The invention claimed is:

1. An electronic terminal device, comprising:
   a processor that processes processor-executable instructions and other data, at least functionally connected to each of
      a user interface (UI) apparatus that interfaces the electronic terminal device with a user, the UI apparatus comprising a display and a user input device,
      a memory that stores the instructions and other data, and
      a communication interface that transfers data between the processor and external entities,
   the processor being configured, in accordance with the processor-executable instructions, to:
      store, in the memory, data comprising a plurality of digital content fingerprints that each correspond to a usage of display content, said display content being displayed on the display based on instructions of one or more software entities that operate on the electronic terminal device; and
      generate and record log data, comprising behavioral data indicative of engagement by a user with the UI apparatus of the electronic terminal device, said log data generated by carrying out detection and logging of usage, by a user, of graphical objects rendered on the display in accordance with the instructions of the one or more software entities that operate on the electronic terminal device, and searching for and detecting one or more matches between the stored digital content fingerprints and the detected usage of the display content by the user generated and stored as the log data, and
      storing indication of said detection of said one or more matches in said memory,
   wherein the processor is further configured i) to determine a status of the display, and ii) to carry out the generating and logging of the log data according to the determined status of the display,
   wherein the determined status of the display indicates, at least, whether or not the display is in active use by the user,
   wherein, upon a determination from the status that the display is in active use by the user, the generating and recording of the log data is performed, and
   wherein, upon a determination from the status that the display is not in use, the processor continues to generate and record said log data, and further i) generates metadata and ii) includes said metadata with said log data,
   said included metadata being an indicator that said log data is data collected and logged when the display is not in use,
   and wherein the processor is further configured to interact with and receive data from at least one external device, said data received being indicative of user engagement with the UI of the external device, and to determine an indication of a level of user attention spread across the electronic terminal device and said at least one external device, where one of the electronic terminal device and said at least one external device is determined as capturing a highest level of user attention.

2. The electronic terminal device of claim 1, wherein said digital content fingerprints comprise information representative of one or more visual objects associated with one or more software entities, said visual objects shown to the user via the display, and said detection of usage of the display incorporates detecting a presence of any of said objects rendered on the display.

3. The electronic terminal device of claim 2, wherein the processor is further configured to detect said presence by utilizing screen capture of display data and performing an analysis of the obtained display data by performing a comparison of the obtained display data with the stored digital content fingerprints.

4. The electronic terminal device of claim 3, wherein the analysis of the obtained display data comprises execution of a predetermined pattern recognition algorithm.

5. The electronic terminal device of claim 1, wherein the generating and recording the log data comprises at least one control action selected from the group consisting of: including an indication of the determined display status in the logged data, adapting said logging, trigger logging, trigger logging of behavioral data, trigger logging of predetermined data, cease logging, cease logging of behavioral data, cease logging of predetermined data, change logging parameter, and trigger said detecting.

6. The electronic terminal device of claim 1, wherein the processor is further configured to detect one or more matches between the stored digital content fingerprints and one or more software entities shown to the user via the display in accordance with instructions of one or more software entities that operate on the plurality of electronic terminal devices, said detecting taking place exclusively when the display has been determined to be in use.

7. The electronic terminal device of claim 1, wherein the processor is further configured to determine the status of the display based on results of carrying out an inspection of at least one indication associated with the display selected from the group consisting of: display power or current consumption, display brightness, display lock status, a user input interface or user interface lock status, a user input, a display status-indicating application programming interface (API), and a display status variable.

8. The electronic terminal device of claim 1, wherein the processor is further configured to generate and record log data regarding at least one element selected from the group consisting of: user online action, HTTP activity, a sensor, acceleration, accelerometer, illumination or light intensity, application usage, application launch, application termination, user id, process thread, identity of application or service used, a feature used in application or service, device-internal data traffic, network traffic, a source or destination entity of internal and/or network data traffic, a voice call, an application thread counter, a process counter, a message, an e-mail message, a short message, a multimedia message, an instant message, a data counter, a location, battery status, and network signal strength.

9. The electronic terminal device of claim 1, wherein the indication of said detection comprises metadata associated with the stored digital content fingerprints detected as matching with the detected usage of the display content by the user.

10. The electronic terminal device of claim 1, wherein the indication of said detection comprises at least one element selected from the group consisting of: type of display view, active window of multiple simultaneously visible windows, identity of visible windows, identity of the existing windows, identity of application or service in the active window, duration and/or time of use of application or service, transaction, feature or view accessed in the displayed application or service, and user activity regarding application, service or display.

11. The electronic terminal device of claim 1, wherein the processor is further configured to communicate the indication of said detection of said one or more matches to a predetermined external entity for storage, analysis, inspection or distribution.

12. The electronic terminal device of claim 1, wherein the processor is further configured to adapt the generating and recording of the log data based on at least one element selected from the group consisting of: battery status, remaining battery, remaining operating time, and network status.

13. The electronic terminal device of claim 1, wherein the processor is further configured to adapt the generating and recording of the log data through execution of at least one action selected from the group consisting of: triggering collection of predetermined data, interrupting collection of predetermined data, triggering predetermined data processing or analysis procedure, interrupting predetermined data processing or analysis procedure, triggering data transfer with an external entity, and triggering more detailed or coarser detection of objects on the display.

14. The electronic terminal device of claim 1, wherein the processor is configured to detect a transaction based on at least one object rendered on the display data and a match of said transaction with one or more of the plurality of digital content fingerprints, whereupon the processor is further configured to log data regarding the transaction.

15. The electronic terminal device of claim 1, wherein the processor is further configured to monitor whether said generating and recording of log data is functional according to predetermined criterion, and upon a determination that said generating and recording of log data is not functional, the processor activates, reactivates and/or initializes said generating and recording of log data.

16. The electronic terminal device of claim 1, wherein the processor is configured to periodically execute a plurality of predetermined tasks to prevent an operating system of the electronic terminal device from shutting down said generating and recording of log data due to passivity or lack of user interaction.

* * * * *